(12) United States Patent
Lari

(10) Patent No.: US 9,655,348 B2
(45) Date of Patent: May 23, 2017

(54) FISH DISPLAY AND WATER CIRCULATION APPARATUS WITH INDIVIDUALLY REMOVABLE LIVE FISH CONTAINERS

(71) Applicant: Nick L. Lari, Jacksonville, FL (US)

(72) Inventor: Nick L. Lari, Jacksonville, FL (US)

(73) Assignee: NEW PCA, LLC, Orange Park, FL (US)

( * ) Notice: Subject to any disclaimer, the term of this patent is extended or adjusted under 35 U.S.C. 154(b) by 132 days.

(21) Appl. No.: 14/027,675

(22) Filed: Sep. 16, 2013

(65) Prior Publication Data

US 2014/0174374 A1 Jun. 26, 2014

Related U.S. Application Data

(60) Provisional application No. 61/700,927, filed on Sep. 14, 2012, provisional application No. 61/718,442, filed on Oct. 25, 2012.

(51) Int. Cl.
*A01K 63/00* (2006.01)

(52) U.S. Cl.
CPC .......... *A01K 63/006* (2013.01); *A01K 63/003* (2013.01)

(58) Field of Classification Search
CPC ....... A01K 63/00; A01K 63/003; A01K 63/04
USPC ....... 119/245, 247, 248, 249, 250, 251, 253, 119/269
See application file for complete search history.

(56) References Cited

U.S. PATENT DOCUMENTS

| | | | | | |
|---|---|---|---|---|---|
| 3,693,591 | A | * | 9/1972 | Stasio | 119/245 |
| 3,757,739 | A | * | 9/1973 | Whitener | 119/261 |
| 3,772,827 | A | * | 11/1973 | Ware | 47/39 |
| 4,118,891 | A | * | 10/1978 | Kehl et al. | 47/59 R |
| 4,177,604 | A | * | 12/1979 | Friesen | 47/62 R |
| 4,211,034 | A | * | 7/1980 | Piesner | 47/62 E |
| 4,402,280 | A | * | 9/1983 | Thomas | A01K 1/031 119/418 |
| 5,042,425 | A | * | 8/1991 | Frost, Jr. | 119/246 |
| 5,197,409 | A | * | 3/1993 | Hammond | 119/253 |
| 5,440,836 | A | * | 8/1995 | Lee | 47/60 |
| 5,469,810 | A | * | 11/1995 | Chiang | 119/248 |
| 5,513,596 | A | * | 5/1996 | Coiro, Sr. | A01K 1/031 119/457 |
| 6,125,791 | A | * | 10/2000 | Gundersen et al. | 119/228 |
| 6,243,985 | B1 | * | 6/2001 | Miller | 47/39 |
| 6,257,170 | B1 | * | 7/2001 | Gundersen | 119/228 |
| 6,305,324 | B1 | * | 10/2001 | Hallock et al. | 119/248 |
| 6,357,392 | B1 | * | 3/2002 | Ido | 119/252 |
| 7,174,850 | B2 | * | 2/2007 | Hsiao | 119/204 |
| 7,421,976 | B1 | * | 9/2008 | Travers | 119/264 |
| 2005/0166858 | A1 | * | 8/2005 | Lari | 119/269 |
| 2006/0102086 | A1 | * | 5/2006 | Abraham | 119/217 |
| 2006/0156624 | A1 | * | 7/2006 | Roy et al. | 47/62 R |
| 2009/0095226 | A1 | * | 4/2009 | Riemma | 119/245 |
| 2009/0126269 | A1 | * | 5/2009 | Wilson et al. | 47/62 R |

(Continued)

*Primary Examiner* — Monica Williams
*Assistant Examiner* — Morgan T Barlow
(74) *Attorney, Agent, or Firm* — Mark Young, PA

(57) ABSTRACT

A fish display apparatus continuously circulating water through a plurality of removable live fish containers, whereby a large number of individual containers containing one or more fish may be easily displayed to customers and whereby any single container may be removed by the customer for purchase of the fish contained therein without stopping or interfering with the flow of water passing through the remaining containers.

13 Claims, 8 Drawing Sheets

(56) References Cited

U.S. PATENT DOCUMENTS

2010/0071629 A1* 3/2010 Wu et al. .................. 119/207
2011/0290007 A1* 12/2011 Sudkamp ............... A01K 63/04
                                                    73/60.11

* cited by examiner

FISH DISPLAY AND WATER CIRCULATION APPARATUS WITH INDIVIDUALLY REMOVABLE LIVE FISH CONTAINERS

This application claims the benefit of U.S. Provisional Patent Application Ser. No. 61/700,927, filed Sep. 14, 2012, and U.S. Provisional Patent Application Ser. No. 61/718,442, Oct. 25, 2012.

BACKGROUND OF THE INVENTION

Pet stores must maintain large quantities of live fish for sale to consumers. In most cases, a plurality of fish of similar type are housed in a single aquarium and individual fish are removed by hand netting and transferred into individual containers or bags when purchased. Certain fish, however, such as the Siamese fighting or Better fish, must be isolated in separate containers to prevent the fish from attacking each other. These fish thus require special care, handling and display.

It is an object of this invention to provide an apparatus to display fish and continuously circulate water through a plurality of removable live fish containers, whereby a large number of individual containers containing one or more fish may be simultaneously displayed to customers and whereby any single fish container may be removed by a customer for purchase of the fish contained therein without interfering with the flow of water through the remaining fish containers.

SUMMARY OF THE INVENTION

In a first embodiment, the invention is a fish display apparatus continuously circulating water through a plurality of removable live fish containers, whereby a large number of individual containers containing one or more fish may be simultaneously displayed to consumers and whereby any single container may be removed by a customer for purchase of the fish contained therein without interfering with or interrupting water flow through the remaining containers. The apparatus comprises in general a multi-shelf array or assembly in fluid communication with a reservoir tank containing a water pump to deliver water into and through the individual fish containers. The water is supplied to the individual containers through a vertically oriented supply conduit in fluid communication with multiple horizontally oriented transverse supply troughs. Individual containers are arrayed in rows beneath the transverse supply troughs in association with displacement valves positioned on the undersides of the transverse supply troughs. Each of the individual containers is provided with a physical mechanism to open the associated valve such that water will be delivered into the container when the fish container is in place. An outflow opening or conduit delivers excess water from each container into one of multiple horizontally oriented transverse return troughs or conduits. Excess water from the transverse supply troughs and the water from the transverse return troughs enters a vertically oriented return conduit and is delivered back into the reservoir tank. The displacement valves in the bottom member of the transverse supply troughs are open only when a container is in position below the valve, such that when a container is removed or not present the valve is in the closed status.

In a second embodiment, the invention is a fish display apparatus continuously circulating water through a plurality of removable live fish containers, whereby a large number of individual containers containing one or more fish may be simultaneously displayed to consumers and whereby any single container may be removed by a customer for purchase of the fish contained therein without interfering with or interrupting water flow through the remaining containers. The apparatus comprises in general a multi-shelf array or assembly in fluid communication with a reservoir tank containing a water pump to deliver water into a superiorly positioned gravity tank for distribution to the individual fish containers. The water is supplied to the individual containers through a vertically oriented supply conduit depending from the gravity tank and multiple horizontally oriented transverse supply conduits having individual apertures. Individual containers are arrayed in rows below the transverse supply conduits and are associated with individual rocker valves positioned beneath the apertures of the transverse supply conduits. When there is no container in position at a given location in the array, the rocker valve diverts water directly into the multiple horizontally oriented transverse return troughs. When a container is inserted into the array the associated rocker valve is pivoted so that water from the aperture of the transverse supply conduit is diverted into the container. An outflow opening delivers excess water from each container into the multiple horizontally oriented transverse return troughs. Excess water from the gravity tank and the water from the transverse return troughs enters a vertically oriented return conduit and is delivered back into the reservoir tank.

In other terms, the invention is a fish display and water circulation apparatus comprising a plurality of removable fish containers; a multi-shelf assembly comprising a plurality of horizontal shelves removably retaining said fish containers, a gravity tank, transverse supply conduits and transverse return troughs; a reservoir tank retaining water, said reservoir tank in fluid communication with said gravity tank, said transverse supply conduits and said transverse supply troughs; a water pump delivering water from said reservoir tank through said gravity tank to said transverse supply conduits, whereby water flow through said fish containers is continuous when said water pump is in operation; valves in fluid communication with said transverse supply conduits, each of said valves being associated with and actuated by one of said fish containers retained by said horizontal shelves, said valves delivering water from said transverse supply conduit into said fish containers; each of said fish containers comprising an outflow opening, whereby water delivered into said fish containers passes through said outflow openings and is returned to said reservoir tank; and whereby upon removal of any of said fish containers, said valves associated with said removed fish container divert water into said transverse return troughs for return to said reservoir tank.

In one embodiment of the invention, the valves of the invention comprise displacement valves. In another embodiment of the invention, the valves of the invention comprise rocker valves, whereby for each said valve associated with one of said fish containers, said rocker valve delivers water from said transverse supply conduits into said fish container when said fish container is retained on said shelves, and whereby said rocker valve delivers water from said transverse supply conduits into said transverse return troughs when said fish container is removed from said shelves.

DETAILED DESCRIPTION OF THE INVENTION

Figure 1:
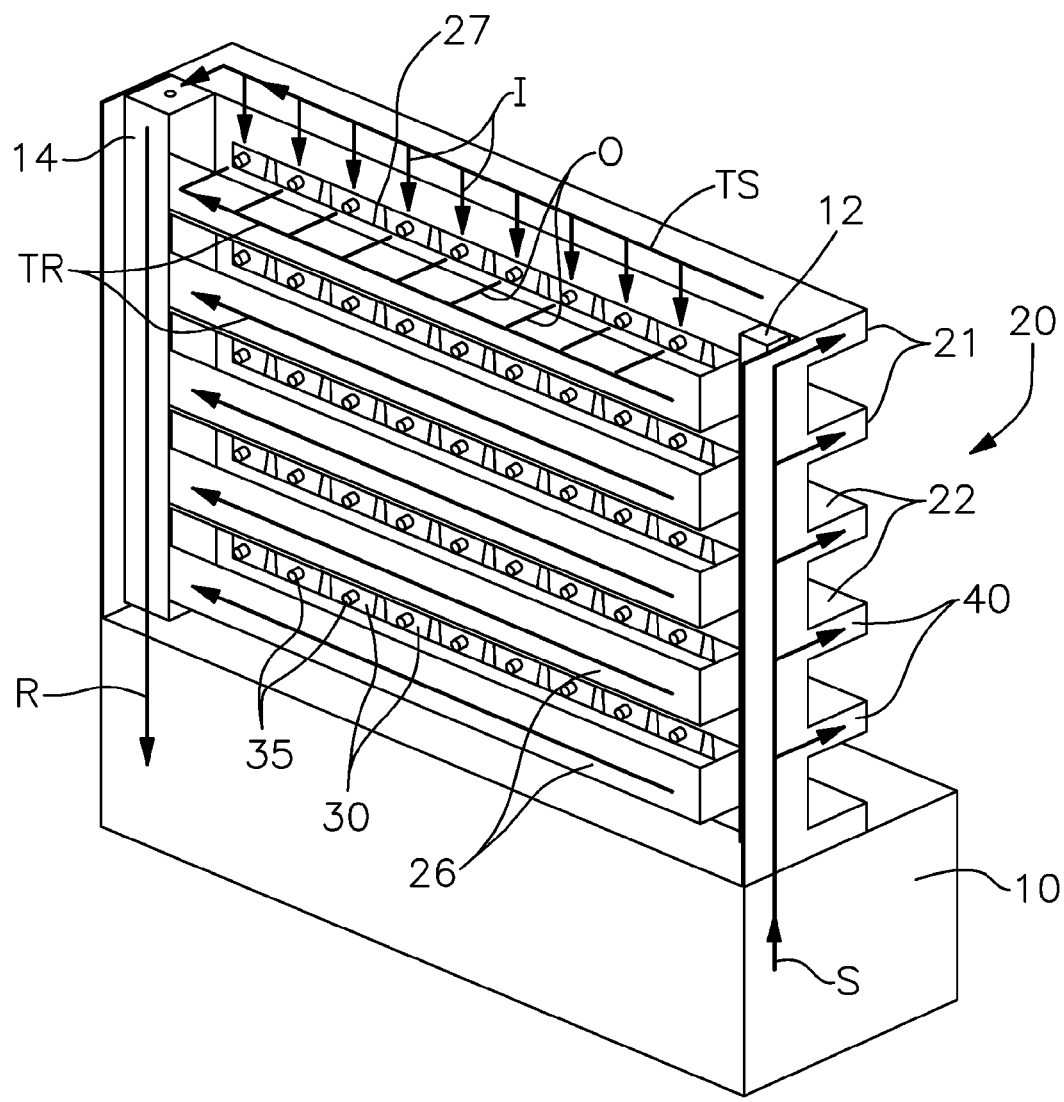
FIG. 1 is a rear perspective view of a first embodiment of the invention.
Figure 2:
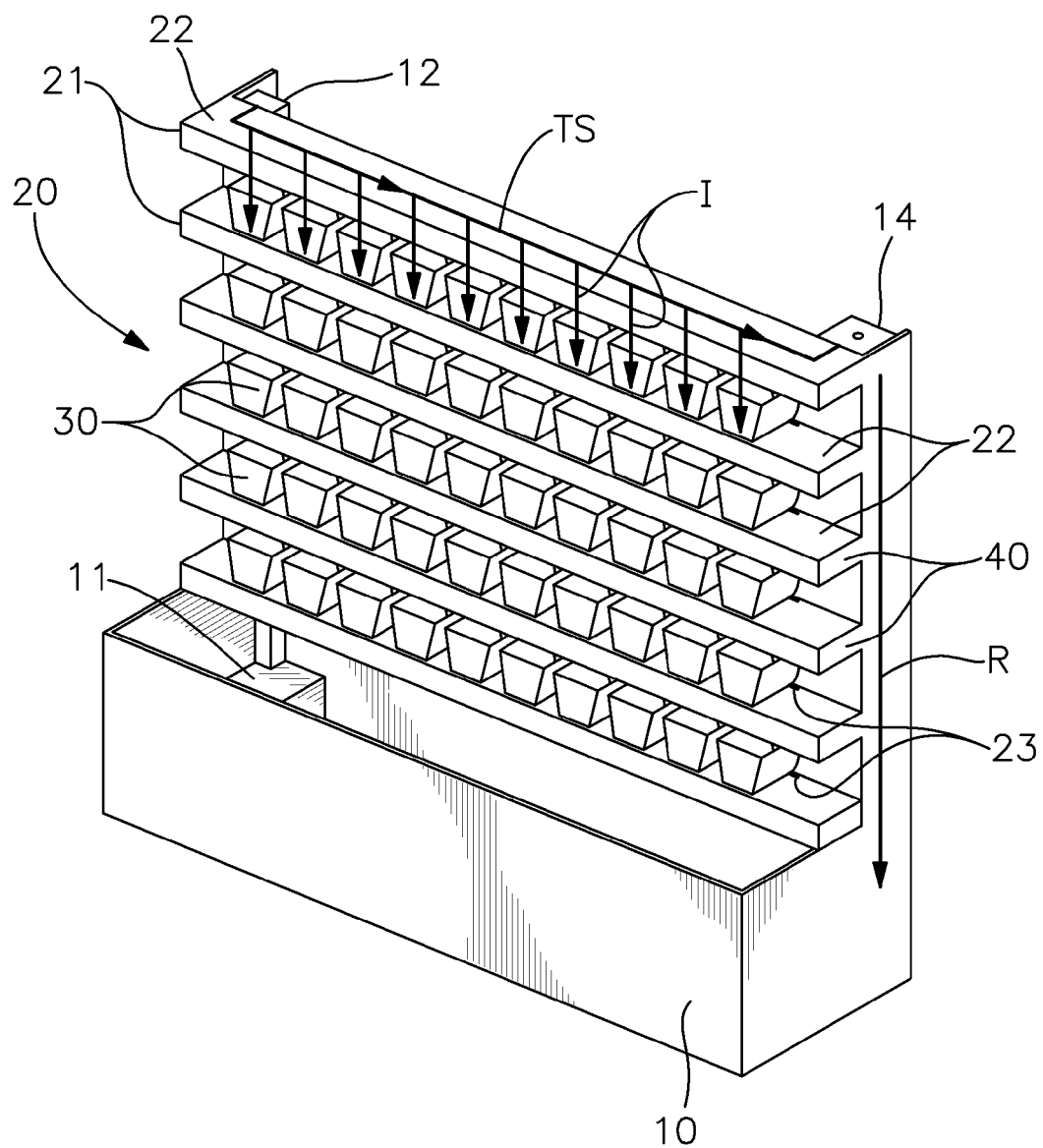
FIG. 2 is a front perspective view of the embodiment of FIG. 1.
Figure 3:
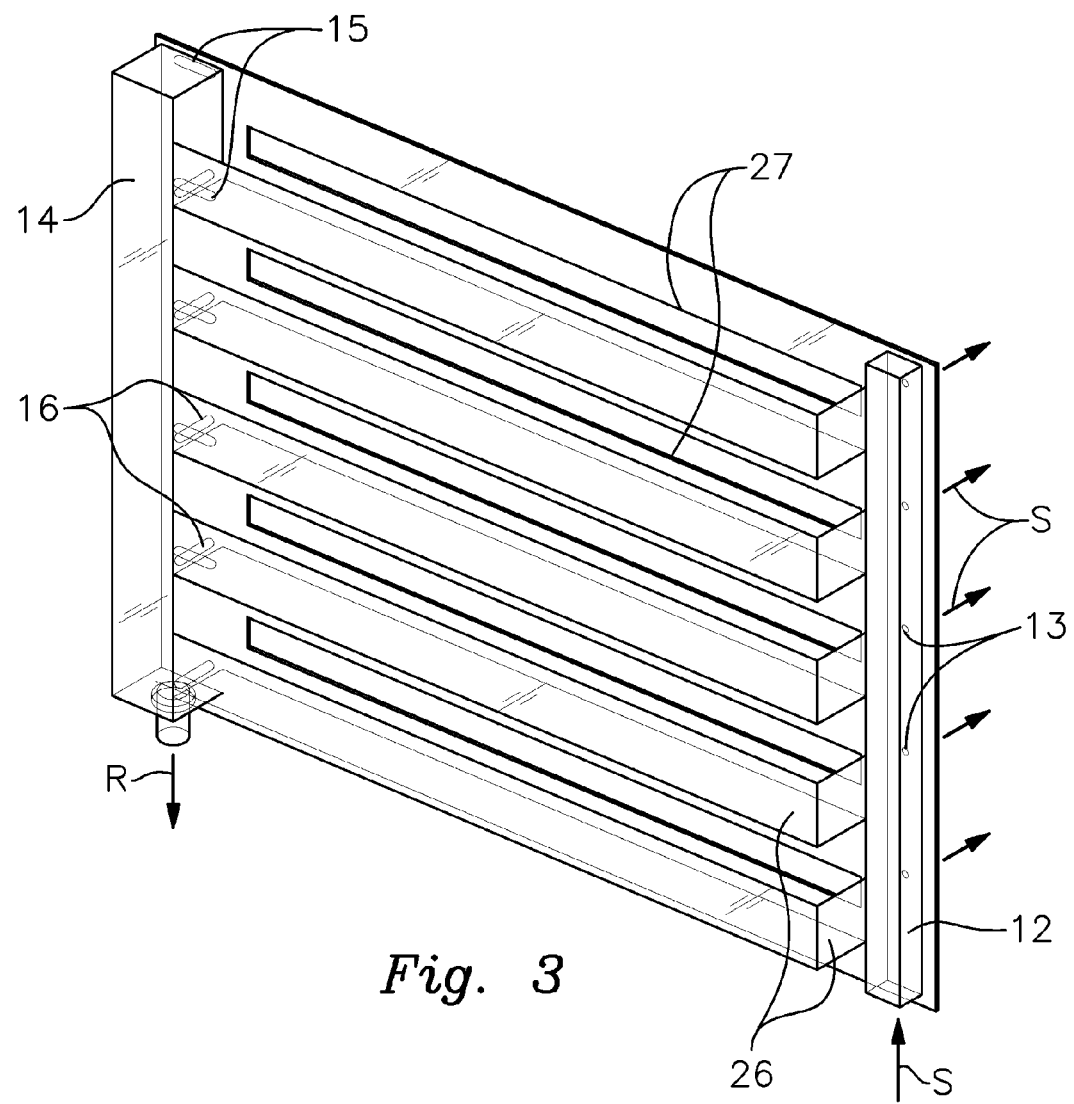
FIG. 3 is a rear perspective view of a portion of the embodiment of FIG. 1.

As shown in the embodiments depicted in the drawings, the illustrations being intended as non-limiting, the invention is in a first embodiment an apparatus adapted to display fish and to continuously circulate water through a plurality of removable live fish containers 30, whereby a large number of individual fish containers 30 containing for example a single fish may be easily displayed to customers and whereby any single container 30 may be removed by the customer for purchase of the fish contained therein without ceasing water flow to the remaining fish containers 30. The apparatus comprises in general a multi-shelf array or assembly 20 in fluid communication with a reservoir tank 10 containing a water pump 11 to deliver water into the individual fish containers 30. The water is supplied to the individual containers 30 through a vertically oriented supply conduit 12 having a plurality of supply orifices, spouts or nozzles 13, each supply orifice 13 being associated with one of a plurality of horizontally oriented transverse supply conduits 21, preferably in this embodiment in the form of troughs. Each transverse supply conduit 21 comprises a bottom member 24, and except for the uppermost transverse supply conduit 21, defines a horizontal shelf 40 that comprises an upper support member 22 to support fish containers 30. Alternatively, the first containers 30 may be suspended beneath the horizontal shelves 40. Drain apertures 23 are preferably provided on upper support members 22 of the transverse supply conduits 21, except for the uppermost transverse supply conduit 21, such that any spilled or excess water may be directed into transverse return troughs 26. Each transverse supply conduit 21 has a horizontally oriented transverse return trough 26 associated therewith, the term "trough" being used herein to designate any suitable return conduits structured to receive water from either the fish containers 30 or the transverse supply conduits 21.

Figure 4:
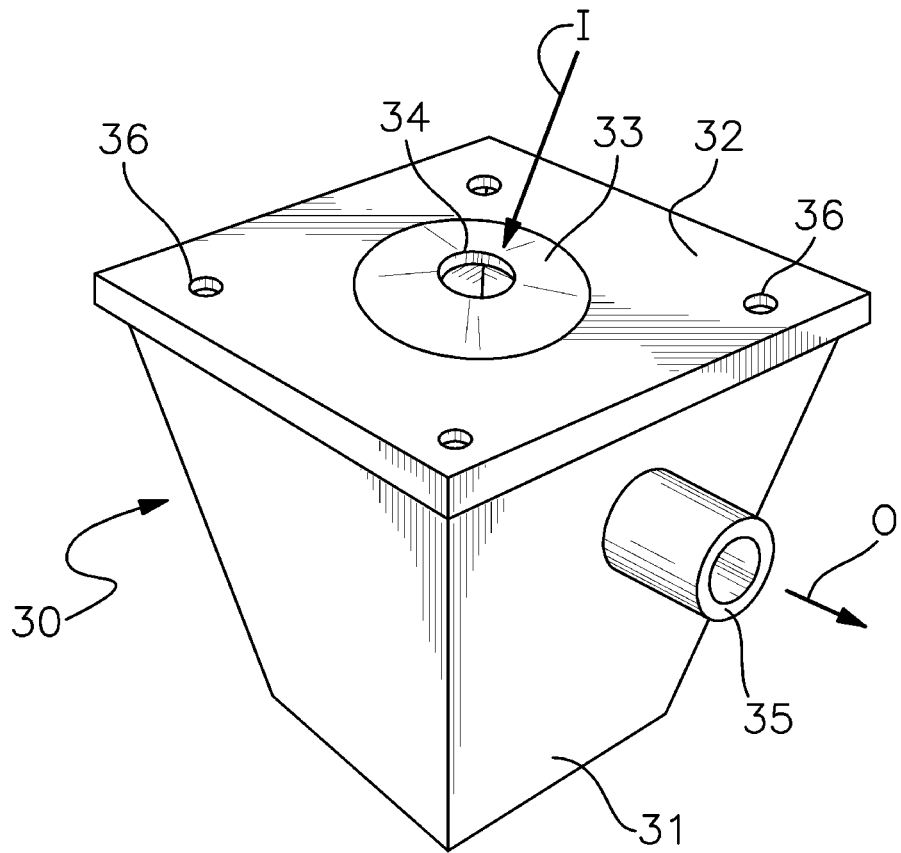
FIG. 4 is a perspective view of an embodiment for an individual fish container.
Figure 5:
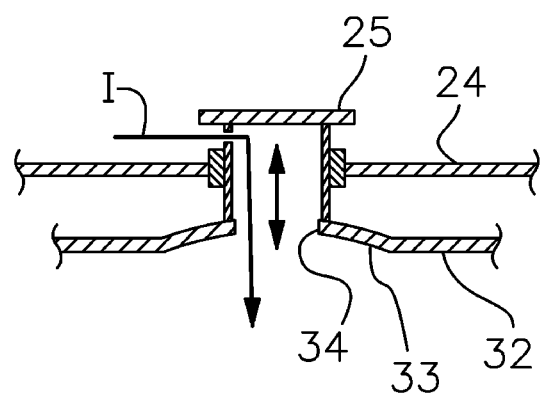
FIG. 5 is a cross-sectional view of an embodiment for a displacement valve.
Figure 6:
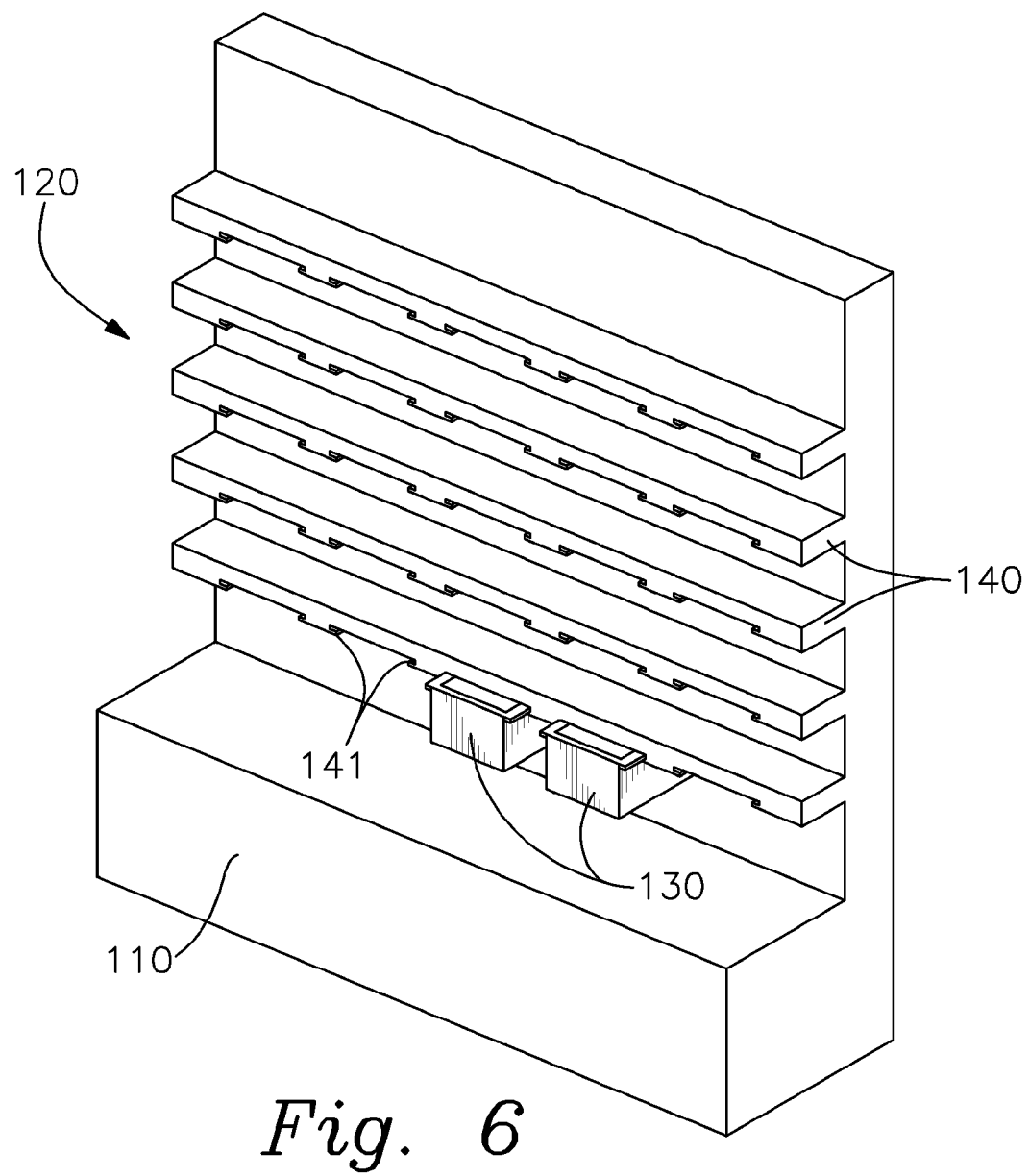
FIG. 6 is a front perspective view of a second embodiment of the fish display apparatus showing a small number of individual fish containers in position on the array.
Figure 7:
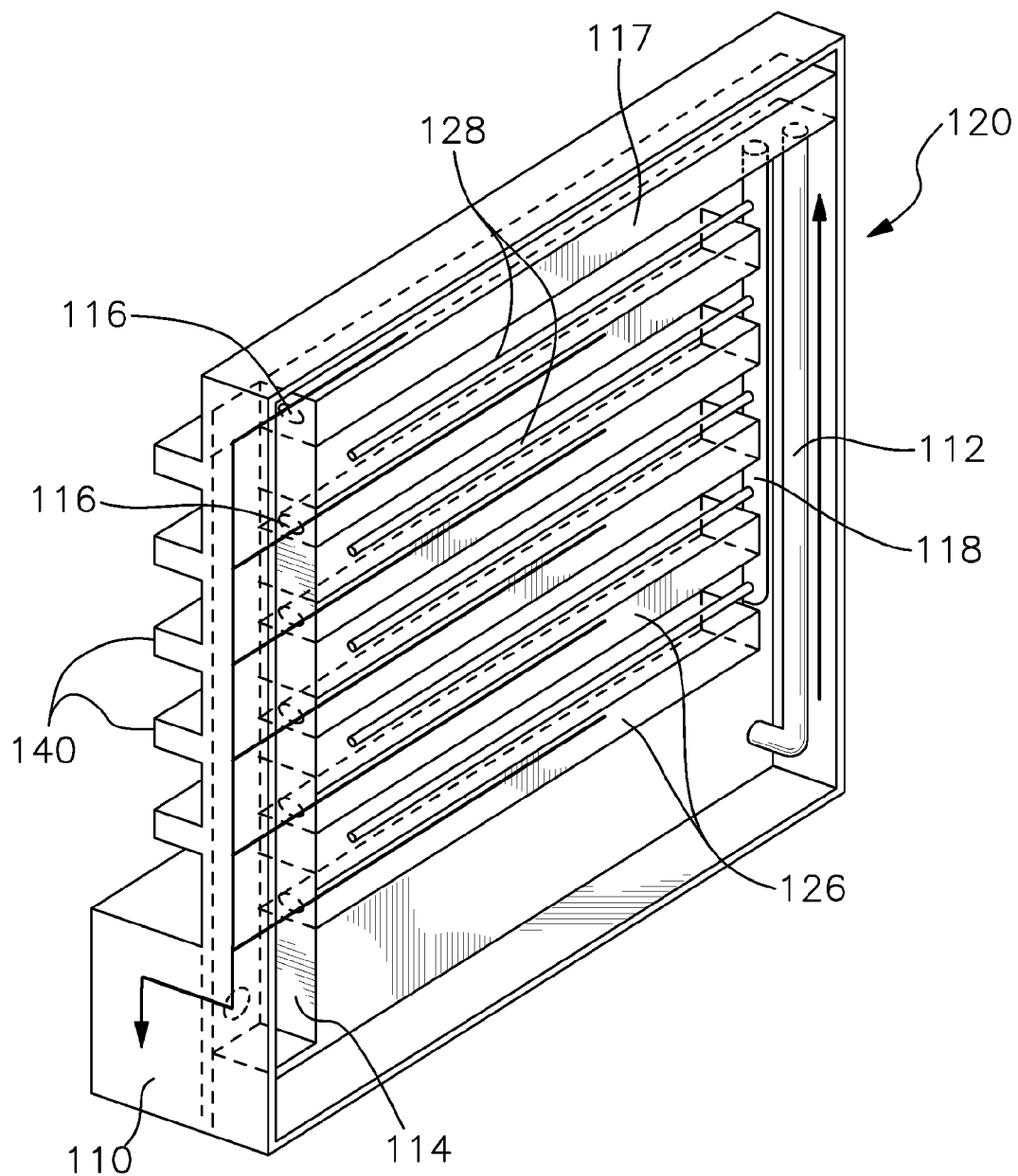
FIG. 7 is a rear perspective view of the embodiment of FIG. 6.
Figure 8:
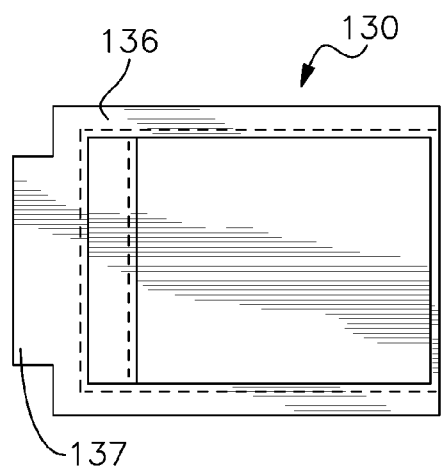
FIG. 8 is a top view of an embodiment of an alternative embodiment of an individual fish container.
Figure 9:
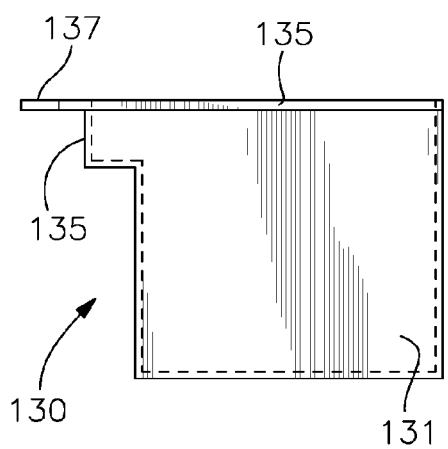
FIG. 9 is a side view of the embodiment of the individual fish container shown in FIG. 8.

Individual fish containers 30 are arrayed in rows beneath the transverse supply conduits 21, and preferably are retained on the upper support members 22 of the next lower transverse supply conduit 21. Each container 30 comprises a base 31, a lid 32 and a valve actuating mechanism 33. In the embodiment shown in FIG. 4, the valve actuating mechanism 33 comprises a raised area surrounding an inflow opening 34 in the container lid 32. Each container 30 also comprises an outflow opening, spout or conduit 35 positioned in the upper portion of the container base 31. The containers 30 are arrayed beneath the transverse supply conduits 21 such that the outflow conduits 35 face to the rear and direct water into the transverse return troughs 26. The transverse return troughs 26 may be provided with a single or multiple front openings or windows 27 to receive the outflow conduits 35. Vents 36 may be provided in the container lids 32.

A plurality of valves 25, in this embodiment preferably of the biased displacement type whereby the valve 35 is opened only when a surface or object is positioned beneath the valve 25, are located in spaced relation on the bottom members 24 of the transverse supply conduits 21. The valves 35 are spaced such that a single valve 35 is associated with a single container 30. Thus, with a container 30 properly positioned beneath the transverse supply trough 26, the valve actuating mechanism 33 opens the associated valve 35 such that water may be delivered from the transverse supply conduit 21 into the container 30.

Excess water from the transverse supply conduits 21 and the water delivered into the transverse return troughs 26 from the outflow conduits 35 of the containers 30 pass through front return openings 15 and side return openings 16, respectfully, into a vertically oriented return conduit 14, such that the water is delivered back to the reservoir tank 10 for recirculation.

As shown in the drawings, water flow paths through the apparatus comprise a supply path S going up the supply conduit 12 through the supply orifices 13 and into the transverse supply conduits 21, a transverse supply path TS through the transverse supply conduits 21 and into the return conduit 14, an inflow path I from the transverse supply conduits 21 down through the valves 25 and into the inflow openings 34 of the containers 30, an outflow path O from the containers 30 through the outflow conduits 35 and into the transverse return troughs 26, a transverse return path TR through the transverse return troughs 26 and into the return conduit 14, and a return path R down through the return conduit 14 into the reservoir tank 10.

Operation of the apparatus is accomplished by providing a plurality of individual containers 30 each containing water and one or more fish. The containers 30 are positioned in the proper locations on the transverse supply conduits 21 such that each container 30 is associated with a valve 25, the presence of a container 30 actuating the valve 25 from closed status to open status. If not already operational, the pump 11 is turned on and water is pumped into the supply conduit 12 and through the supply orifices 13 to direct water into the interiors of the transverse supply conduits 21. A portion of this water is delivered through each open valve 25 into the containers 30 beneath a given transverse supply conduit 21 such that fresh water is constantly circulated through the containers 30, the excess water from each container 30 passing from the outflow conduits 35 into the transverse return troughs 26 for delivery through the return conduit 14 into the reservoir tank 10. Excess water in the transverse supply conduits 21 not delivered into the individual containers 30 passes directly into the return conduit 14 and back into the reservoir tank 10. When a container 30 is removed from the shelf array assembly 20, the valve 25 automatically closes to preclude loss of water from the transverse supply conduit 21. The containers 30 may be provided with barcodes or other pricing indicia. Preferably, seals for closure of the outflow opening 35 and/or the inflow opening 34 are provided for use at time of purchase when the containers 30 are to be kept by the customer.

With this apparatus, a plurality of fish containers 30 may be optimally displayed during business hours, the apparatus providing for a continuous flow of water through the containers 30 to provide an invigorating and healthy environment for the fish. Consumers may choose and remove individual containers 30 for purchase without requiring assistance from the store personnel. Restocking the containers 30 is easily accomplished since each container 30 can be individually removed and replaced. Because of the automatic valve operation, any number of containers 30 less than the maximum allowable number may be accommodated at any given time.

Preferably the reservoir tank 10 and the shelf array assembly 20 are constructed as a single unit, but it is understood that these components could be physically separated and hoses, tubes or the like used to deliver water from the reservoir tank 10 to the supply conduit 12 and to return water to the reservoir tank 10 from the return conduit 14. Furthermore, the water could be supplied to the top of the supply conduit 12 rather than up through the bottom.

As shown in the embodiments depicted in the drawings, the illustrations being intended as non-limiting, the invention in a second embodiment is an apparatus or array 120 adapted to display fish and to continuously circulate water through a plurality of removable live fish containers 130, whereby a large number of individual containers 130 containing for example a single fish may be easily displayed to customers and whereby any single container 130 may be removed by the customer for purchase of the fish contained therein. The apparatus 120 comprises in general an array or assembly having a plurality of shelves 140 providing display locations for the fish containers 130, each of which is in fluid communication with a reservoir or sump tank 110 containing a water pump to deliver water through a vertically oriented supply conduit 112 into a gravity tank 117 located near the top of the apparatus 120. The water is then supplied by gravity to the individual containers 130 through a vertically oriented distribution conduit 18 that delivers water to multiple horizontally oriented transverse supply conduits 128. Each transverse supply conduit 128 comprises a plurality of openings, apertures or nozzles 129, each of which is associated with the location of an individual fish container 130. Each transverse supply conduit 128 has a horizontally oriented transverse return trough 126 associated therewith for return of water for recirculation through the system, the term "trough" being used herein to designate any suitable return conduits structured to receive water from either the fish containers 130 or the transverse supply conduits 128.

Individual fish containers 130 are arrayed in rows associated with the transverse supply conduits 128 and are retained within receiving slots 141 located on each of the horizontal shelves 140 of the array 120. Each container 130 comprises a base 131, lateral support flanges 136, a rear outflow opening 135, and a rear displacement flange or tab 137, as shown in FIGS. 8-10 and 12. The containers 130 are arrayed such that the outflow openings 135 face to the rear and direct water into the transverse return troughs 126. Screen covers may be provided for the containers 130 to prevent the fish from jumping from the containers 130.

Figure 10:
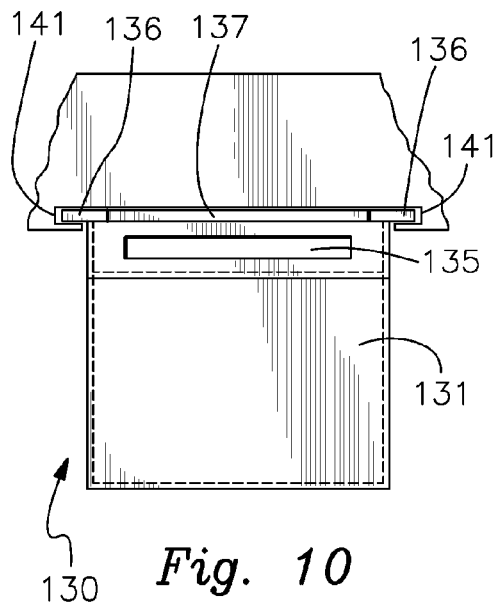
FIG. 10 is a rear view of the embodiment of the individual fish container shown in FIG. 8 as inserted into the receiving slots of the embodiment of the fish display apparatus of FIG. 6.
Figure 11:
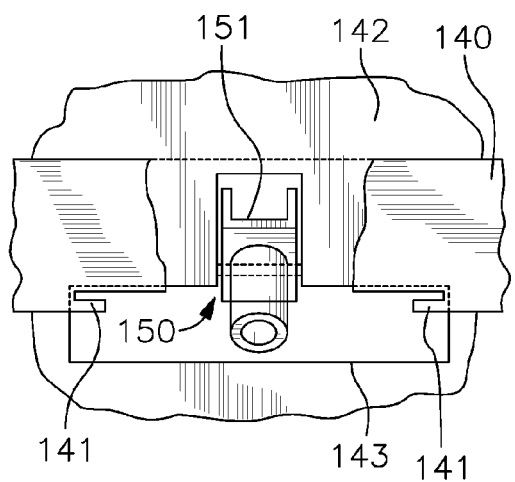
FIG. 11 is a partially exposed front view of a portion of the embodiment of the fish display apparatus of FIG. 6 showing the rocker valve.
Figure 12:
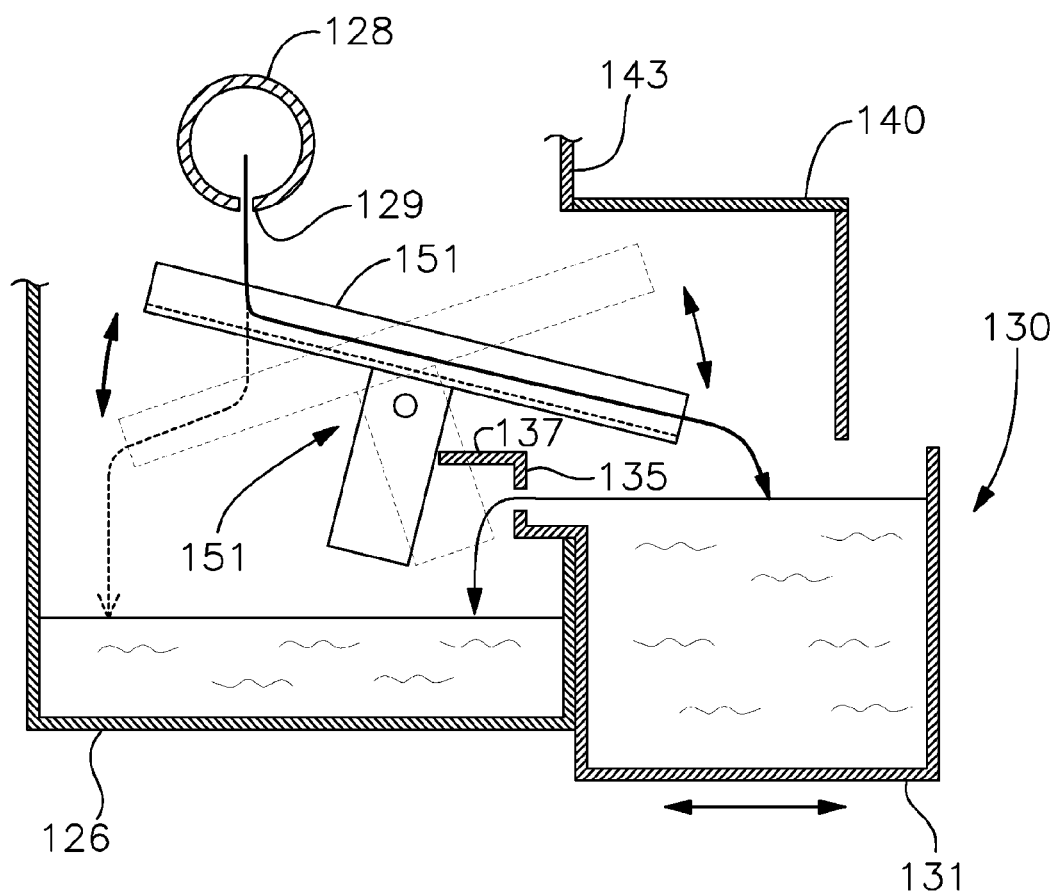
FIG. 12 is a partial cross-sectional view of the embodiment of the individual fish container shown in FIG. 8 as inserted into the receiving slots of the embodiment of the fish display apparatus of FIG. 6 and illustrating operation of the rocker valve.

A rocker valve 150 is associated with each fish container 130 location. Each rocker valve 150 comprises a directional channel 151 with opposing open ends, the directional channel 151 being pivotally mounted such that either end of the directional channel 151 may be lower than the other. Each rocker valve 150 is positioned relative to an opening 129 in the transverse supply conduit 128 such that water from the transverse supply conduit 128 is directed onto the rear portion of the directional channel 151, i.e., to a point to the rear of the pivot axis of the rocker valve 150, as shown in FIG. 12. The front end of the directional channel extends through an opening or slot 143 in the main wall 142 of the shelf array assembly so as to be poisoned above a fish container 130. As shown in FIG. 11, when no fish container 130 is in position in a given location, the directional channel 151 is tilted to the rear by water pressure such that water flows directly into the transverse return troughs 126. When a fish container 130 is inserted into the receiving slots 141, as shown in FIGS. 10 and 12, the rear displacement flange 137 of the container 130 passes through slot 143 and pivots the directional channel 151 such that it is now tilted to the front and water from the transverse supply conduit 128 flows into the container 130 and passes through the rear outflow opening 135 into the transverse return trough 126. When the fish container 130 is removed, the water pressure from the transverse supply conduit 128 pushes down the rear of the directional channel 151 such that water again flows directly into the transverse return trough 126.

Excess water from the gravity tank 117 and the water delivered into the transverse return troughs 126 from the outflow openings 135 of the containers 130, or directly from the transverse supply conduits 128 when no container 130 is in position, pass through side return openings 116 into a vertically oriented return conduit 114, such that the water is delivered back to the reservoir tank 110 for recirculation.

Water flow paths through the apparatus 120 comprise a supply path as it is pumped up the supply conduit 112 from the reservoir tank 110 to the gravity tank 117, and then down through the distribution conduit 118 and into the transverse supply conduits 128 and out the individual openings 129 onto the directional channels 151 of the rocker valves 150. Water is then directed directly into the transverse return troughs 126 or into the fish containers 130 and then back into the transverse return troughs 126 through the rear outflow openings 135 in the fish containers 130. Water then passes from the transverse return troughs 126 into the vertical return conduit 114 and back into the reservoir tank 110 for recirculation.

Operation of the apparatus 120 is accomplished by providing a plurality of individual containers 130 each containing water and one or more fish. The lateral flanges 136 of the containers 130 are positioned in the receiving slots 141 such that each container 130 is associated with a rocker valve 150, the presence of a container 130 tilting the rocker valve 150 to deliver water into the container 130. In this manner fresh water is constantly circulated through the containers 130, the excess water from each container 130 passing from the outflow opening 135 into the transverse return troughs 126 for delivery through the return conduit 114 into the reservoir tank 110. When no container 130 is present at a given location or a container 130 is removed from the shelf array assembly 120, the water flows directly into the transverse supply troughs 126, into the return conduit 114 and then back into the reservoir tank 110. The containers 130 may be provided with barcodes or other pricing indicia. Preferably, container lids or covers that also seal the outflow opening 135 are provided for use at time of purchase when the containers 130 are to be kept by the customer.

With this apparatus 120, a plurality of fish containers 130 may be optimally displayed during business hours, the apparatus 120 providing for a continuous flow of water through the containers 130 to provide an invigorating and healthy environment for the fish. Consumers may choose and remove individual containers 130 for purchase without requiring assistance from the store personnel. Restocking the containers 130 is easily accomplished since each container 130 can be individually removed and replaced. Because of the automatic operation of the rocker valves 150, any number of containers 130 less than the maximum allowable number may be accommodated at any given time.

Preferably the reservoir tank 110 and the shelf array assembly 120 are constructed as a single unit, but it is understood that these components could be physically separated and hoses, tubes or the like used to deliver water from the reservoir tank 110 to the supply conduit 112 and to return water to the reservoir tank 110 from the return conduit 114. Preferably the containers 130 extend beyond the front of the shelves 140 of the display apparatus such that external light will illuminate the containers 130, and/or LED's or similar lights may be provided for this purpose. Drains may be provided in the in the upper surfaces of the shelves 140 o redirect any spillage into the transverse return troughs 126.

It is understood and contemplated that equivalents and substitutions for elements and structures described above may be obvious to those of skill in the art, and therefore the true scope and definition of the invention is to be as set forth in the following claims.

I claim:

1. A fish display and water circulation apparatus comprising: a water retaining reservoir tank; a multi-shelf assembly in fluid communication with said reservoir tank, said multi-shelf assembly comprising a plurality of horizontal shelves, transverse supply conduits and transverse return troughs; a plurality of removable, open-topped, lid-less fish containers retained on said shelves; a water pump delivering water from said reservoir tank to said transverse supply conduits; each transverse supply conduit including at least one outlet; pivoting rocker valves in fluid communication with said transverse supply conduits, each of said valves being associated with and actuated by one of said fish containers, said valves delivering water from said transverse supply conduit into said fish containers; wherein upon removal of any of said fish containers, said valve associated with said removed fish container diverts water into said transverse return troughs for return to said reservoir tank: whereby for each said rocker valve associated with one of said fish containers, said rocker valve delivers water from said transverse supply conduits into said fish container when said fish container is retained on said shelves, and wherein said rocker valve delivers water from said transverse supply conduits into said transverse return troughs when said fish container is removed from said shelves; and further wherein each of said fish containers comprises a valve-less outflow opening, wherein water received from said transverse supply conduits through said rocker valves passes through said outflow openings and is returned to said reservoir tank; each rocker valve comprising a channel having an oven top, a first end and an opposite second end; a lever extending from the channel; a fulcrum between the first end of the channel and the second end of the channel; said channel being pivotable about said fulcrum from a first orientation to a second orientation; the first end of the channel being disposed beneath and in fluid communication with one of the openings in one of the transverse supply conduits and further being disposed above and in fluid communication with one of the transverse return troughs, and the second end of the channel being disposed above and in fluid communication with one of the fish containers when said one of the fish containers is retained on one of said shelves; and the channel providing a fluid flow path from said one of the openings in said one of the transverse supply conduits to said one of the fish containers when said channel is in the second orientation; and said one of the fish containers including a flange in abutting alignment with the lever and urging the lever and causing the channel to remain in the second orientation when said one of the fish containers is retained on one of said shelves.

2. The apparatus of claim 1, further comprising a supply conduit delivering water from said reservoir tank to said transverse supply conduits and a return conduit delivering water from said transverse return troughs to said reservoir tank.

3. The apparatus of claim 1, wherein said transverse supply conduit is a tubular member having a plurality of apertures.

4. The apparatus of claim 1, wherein said fish containers are suspended from said shelves.

5. The apparatus of claim 1, wherein said fish containers disposed atop said shelves.

6. The apparatus of claim 1, further comprising a gravity tank positioned above said transverse supply conduits, wherein water from said reservoir tank is delivered to said transverse supply conduits through said gravity tank.

7. The apparatus of claim 1, wherein water delivered into said transverse supply conduits which is not delivered through said valves returns to said reservoir tank.

8. The apparatus of claim 1, wherein water flow through said fish containers is continuous when said water pump is in operation.

9. A fish display and water circulation apparatus comprising: a plurality of removable, open-topped, lid-less fish containers; a multi-shelf assembly comprising a plurality of horizontal shelves retaining said fish containers, transverse supply conduits and transverse return troughs; each transverse supply conduit including at least one outlet; a reservoir tank retaining water, said reservoir tank in fluid communication with said transverse supply conduits and said transverse supply troughs; a water pump delivering water from said reservoir tank to said transverse supply conduits; pivoting rocker valves in fluid communication with said transverse supply conduits, each of said rocker valves being associated with and actuated by one of said fish containers retained by said horizontal shelves, said rocker valves delivering water from said transverse supply conduit into said fish containers; each of said fish containers comprising a valve-less outflow opening, wherein water delivered into said fish containers passes through said outflow openings and is returned to said reservoir tank; and wherein upon removal of any of said fish containers, said valves associated with said removed fish container divert water into said transverse return troughs for return to said reservoir tank; each rocker valve comprising an open top channel having a first end and an opposite second end, a lever extending from the channel, a fulcrum between the first end of the channel and the second end of the channel, said open top channel being pivotable about said fulcrum from a first orientation to a second orientation; the first end of the channel being disposed beneath and in fluid communication with one of the openings in one of the transverse supply conduits and further being disposed above and in fluid communication with one of the transverse return troughs, and the second end of the channel being disposed above and in fluid communication with one of the fish containers when said one of the fish containers is retained on one of said horizontal shelves.

10. The apparatus of claim 9, further comprising a gravity tank positioned above said transverse supply conduits, wherein water from said reservoir tank is delivered to said transverse supply conduits through said gravity tank.

11. The apparatus of claim 9, wherein water flow through said fish containers is continuous when said water pump is in operation.

12. A fish display and water circulation apparatus comprising: a plurality of removable. open-topped, lid-less fish containers; a multi-shelf assembly comprising a plurality of horizontal shelves removably retaining said fish containers, a gravity tank, transverse supply conduits and transverse return troughs; each transverse supply conduit including at least one outlet; a reservoir tank retaining water, said reservoir tank in fluid communication with said gravity tank, said transverse supply conduits and said transverse supply troughs; a water pump delivering water from said reservoir tank through said gravity tank to said transverse supply conduits, wherein water flow through said fish containers is continuous when said water pump is in operation; pivoting rocker valves in fluid communication with said transverse supply conduits, each of said rocker valves being associated with and actuated by one of said fish containers retained by said horizontal shelves, said rocker valves delivering water from said transverse supply conduit into said fish containers; each of said fish containers comprising a valve-less outflow opening, wherein water delivered into said fish containers passes through said outflow openings and is returned to said reservoir tank; and wherein upon removal of any of said fish containers, said rocker valves associated with said removed fish container divert water into said transverse return troughs for return to said reservoir tank; each rocker valve comprising an open top channel having a first end and an opposite second end, a lever extending from the channel, a fulcrum between the first end of the channel and the second end of the channel, said open top channel being pivotable about said fulcrum from a first orientation to a second orientation; the first end of the channel being disposed beneath and in fluid communication with one of the openings in one of the transverse supply conduits and further being disposed above and in fluid communication with one of the transverse return troughs, and the second end of the channel being disposed above and in fluid communication with one of the fish containers when said one of the fish containers is retained on one of said horizontal shelves.

13. The apparatus of claim 12, wherein for each said rocker valve associated with one of said fish containers, said rocker valve delivers water from said transverse supply conduits into said fish container when said fish container is retained on said shelves, and wherein said rocker valve pivots to deliver water from said transverse supply conduits into said transverse return troughs when said fish container is removed from said shelves.

\* \* \* \* \*